Patented Mar. 11, 1924.

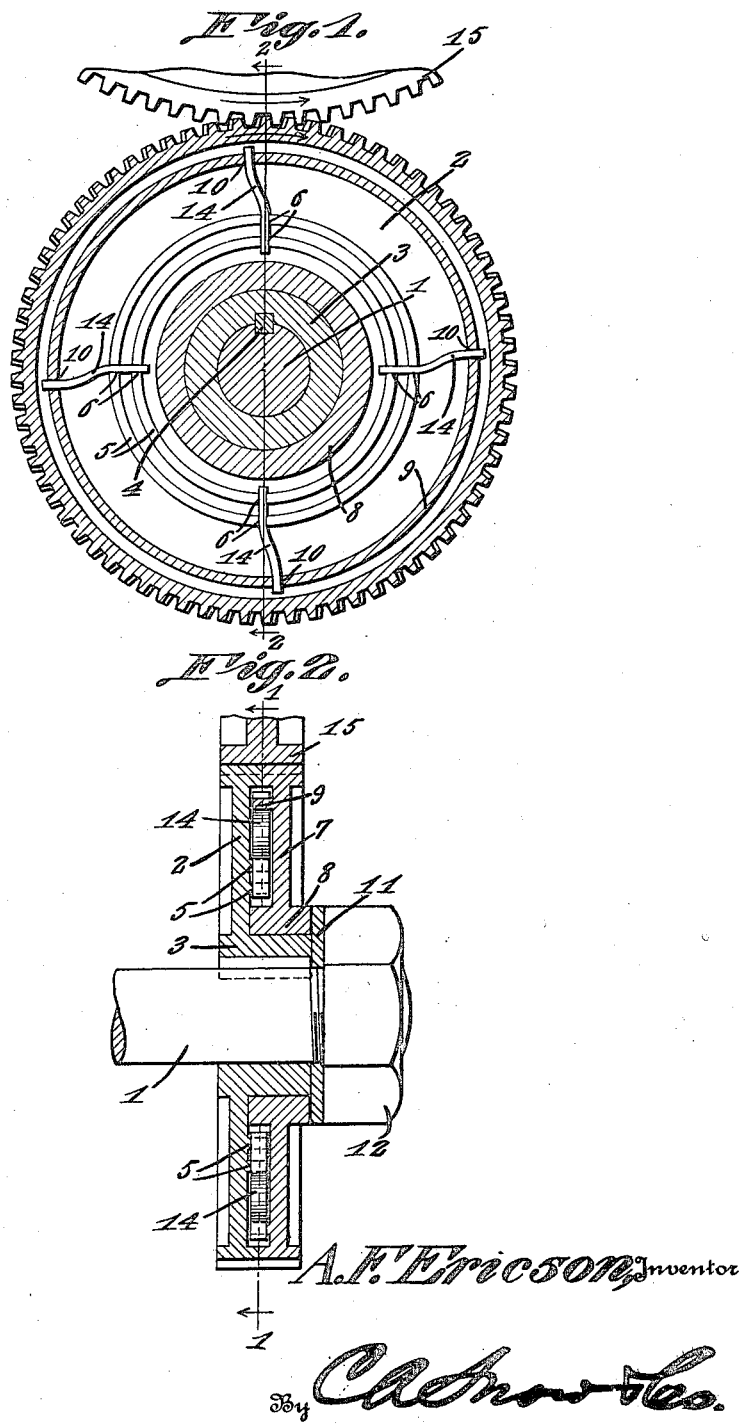

1,486,423

UNITED STATES PATENT OFFICE.

ANTON F. ERICSON, OF PHILIPSBURG, PENNSYLVANIA.

GEARING.

Application filed April 12, 1923. Serial No. 631,704.

*To all whom it may concern:*

Be it known that I, ANTON F. ERICSON, a citizen of the United States, residing at Philipsburg, in the county of Clearfield and State of Pennsylvania, have invented a new and useful Gearing, of which the following is a specification.

It is the object of this invention to provide a novel means whereby back-lash between intermeshing gear wheels will be prevented, the structure being of peculiar utility for use in connection with the gears which connect the crank shaft with the cam shaft in an internal combustion engine—
although the device hereinafter described is capable of general use and is not confined in its application to the purpose mentioned.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 is a section wherein parts appear in elevation; Figure 2 is a section on the line 2—2 of Figure 1, the line 1—1 in Figure 2 indicating, approximately, the cutting plane on which Figure 1 is taken.

The numeral 1 designates a shaft of any desired sort, for instance, the cam shaft of an internal combustion engine. The numeral 2 designates a pinion comprising a hub 3, secured by a key 4, or otherwise, to the shaft 1. A pinion 2 is provided with annular ribs 5 having transverse seats 6. A second pinion 7 is provided, and includes a hub 8, rotatably mounted on the hub 3 of the pinion 2. The pinions 2 and 7 have marginal flanges, as clearly shown in Figure 2.
The pinion 7 is supplied with an annular rib 9, located outwardly of the ribs 5 on the pinion 2, the ribs 9 and 5 projecting in opposite directions, and the rib 9 of the pinion 7 being supplied with seats 10.
A washer 11 is mounted on the shaft 1 and abuts against the hub 3 of the pinion 2, the washer overlapping the hub 8 of the pinion 7 to hold the pinion in place, rotatably, on the hub 3 of the pinion 2. The washer 11 may be retained on the shaft 1 by means of a nut 12, threaded on the shaft. Springs 14 are provided, and, preferably are in the form of strips, the inner ends of the springs 14 being secured in the seats 6 of the ribs 5 on the pinion 2, the outer ends of the springs being received slidably in the seats 10 of the rib 9 of the pinion 7. Referring to Figure 2, it will be noted that the springs 14 are located between the marginal flanges of the pinions on the one hand, and the hub 8 on the other hand. The numeral 15 designates a driving gear wheel which meshes with the teeth of the pinion 2 and with the teeth of the pinion 7.

Let it be supposed that the gear wheel 15, on the one hand, and the pinions 2 and 7 on the other hand, are to rotate in the direction indicated by the arrows in Figure 1. The nut 12 and the washer 11 are removed from the shaft 1, and the pinion 7 is moved to the right in Figure 2 until it is out of mesh with the gear wheel 3. Then, the pinion 7 is rotated slightly, in a direction opposite to that indicated by the lowermost arrow in Figure 1 until the springs 14 are flexed slightly, thereupon the pinion 7 is pushed back into mesh with the gear wheel 15, the washer 11 and the nut 12 being replaced.

Referring to Figure 1, it will now be obvious that the spring 14 will react in a direction indicated by the lowermost arrow in Figure 1, and, producing a slight relative movement between the pinion 7 and the pinion 2, will cause the teeth of the pinion 7 to be offset slightly with respect to the teeth of the pinion 2, thereby filling the space between the teeth of the gear wheel 15, and taking up back lash or lost motion.

The device forming the subject matter of this application is of utility, regardless of the direction in which the gear wheel 15 is to be rotated. Thus, if rotation is to be imparted in a direction opposite to that indicated by the lowermost arrow in Figure 1, the pinion 7 may be rotated, for adjustment with respect to the pinion 2 in such a direction as to put into the springs 14, a flexure opposite to that shown in Figure 1. The structure, therefore, is of use regardless of the direction of the drive. The pinions 2 and 7 rotate about a common axis, and no eccentric parts are used. The structure forming the subject matter of this application may be interposed in a gear train, with obviously desirable results.

What is claimed is:—

1. In a device of the class described, a pair of pinions located side by side and having a common axis, one pinion being rotatable with respect to the other pinion, for adjustment, the pinions being provided with oppositely projecting annular ribs, springs engaged with the ribs of the pinions, and a gear wheel meshing with both pinions.

2. In a device of the class described, a pair of pinions located side by side and having a common axis, one pinion being rotatable with respect to the other pinion, for adjustment, the pinions being provided with oppositely projecting annular ribs, and a spring engaged with the ribs of the pinions.

In testimony that I claim the foregoing as my own, I have hereto affixed my signature in the presence of two witnesses.

ANTON F. ERICSON.

Witnesses:
  A. G. ERICSON,
  MAUDE M. ERICSON.